US008289905B2

(12) United States Patent
Nawata

(10) Patent No.: US 8,289,905 B2
(45) Date of Patent: Oct. 16, 2012

(54) MOBILE COMMUNICATIONS SYSTEM

(75) Inventor: Mitsuo Nawata, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 329 days.

(21) Appl. No.: 12/801,360

(22) Filed: Jun. 4, 2010

(65) Prior Publication Data
US 2010/0315991 A1 Dec. 16, 2010

(30) Foreign Application Priority Data
Jun. 4, 2009 (JP) .................. 2009-134705

(51) Int. Cl.
*H04Q 7/00* (2006.01)
*H04L 12/28* (2006.01)
(52) U.S. Cl. ....................... 370/328; 370/401
(58) Field of Classification Search .................. 370/315, 370/328, 338, 395.2, 395.21, 401
See application file for complete search history.

(56) References Cited

U.S. PATENT DOCUMENTS

| 6,876,634 | B1* | 4/2005 | Lim | 370/310.1 |
| 7,502,613 | B2 | 3/2009 | Namiki et al. | |
| 7,633,904 | B2* | 12/2009 | Venkatachalam | 370/331 |
| 7,808,943 | B2* | 10/2010 | Nakata | 370/312 |
| 2003/0013445 | A1* | 1/2003 | Fujiwara et al. | 455/435 |
| 2003/0092443 | A1* | 5/2003 | Hiyama et al. | 455/435 |
| 2005/0135296 | A1 | 6/2005 | Yoshida et al. | |
| 2005/0197121 | A1* | 9/2005 | Fujiwara et al. | 455/435.1 |
| 2006/0276226 | A1* | 12/2006 | Jiang | 455/558 |

FOREIGN PATENT DOCUMENTS

| JP | 2003-332970 | 11/2003 |
| JP | 2004-289689 | 10/2004 |
| JP | 2005-176336 | 6/2005 |

* cited by examiner

*Primary Examiner* — Hong Cho
(74) *Attorney, Agent, or Firm* — Bacon & Thomas, PLLC

(57) ABSTRACT

A mobile communications system includes a control station that identifies a base station zone serving as a communications area of a base station and performs position registration of first mobile stations which belongs to the base station; and a relay terminal station that relays radio communications between the base station and a second mobile station, the second mobile station being located outside the base station zone and inside a relay terminal zone. Further, the second mobile station sends a position registration request signal to the base station via the relay terminal station; the base station receives the position registration request signal and transfers the received position registration request signal to the control station; and, after completing the position registration, the control station sends a position registration acknowledgement signal to the second mobile station via the base station and the relay terminal station.

20 Claims, 15 Drawing Sheets

CHANNEL CONFIGURATION OF BASE STATION

C: CONTROL CHANNEL
S1~S3: COMMUNICATION CHANNELS

BETWEEN MOBILE STATIONS 103-1 AND 103-2

SET CHANNEL

BETWEEN MOBILE STATION 103-4 AND
THE OPERATIONS CONSOLE 106-1

SET CHANNEL

DIRECT COMMUNICATION BETWEEN INNER MOBILE
STATION AND OUTER MOBILE STATION

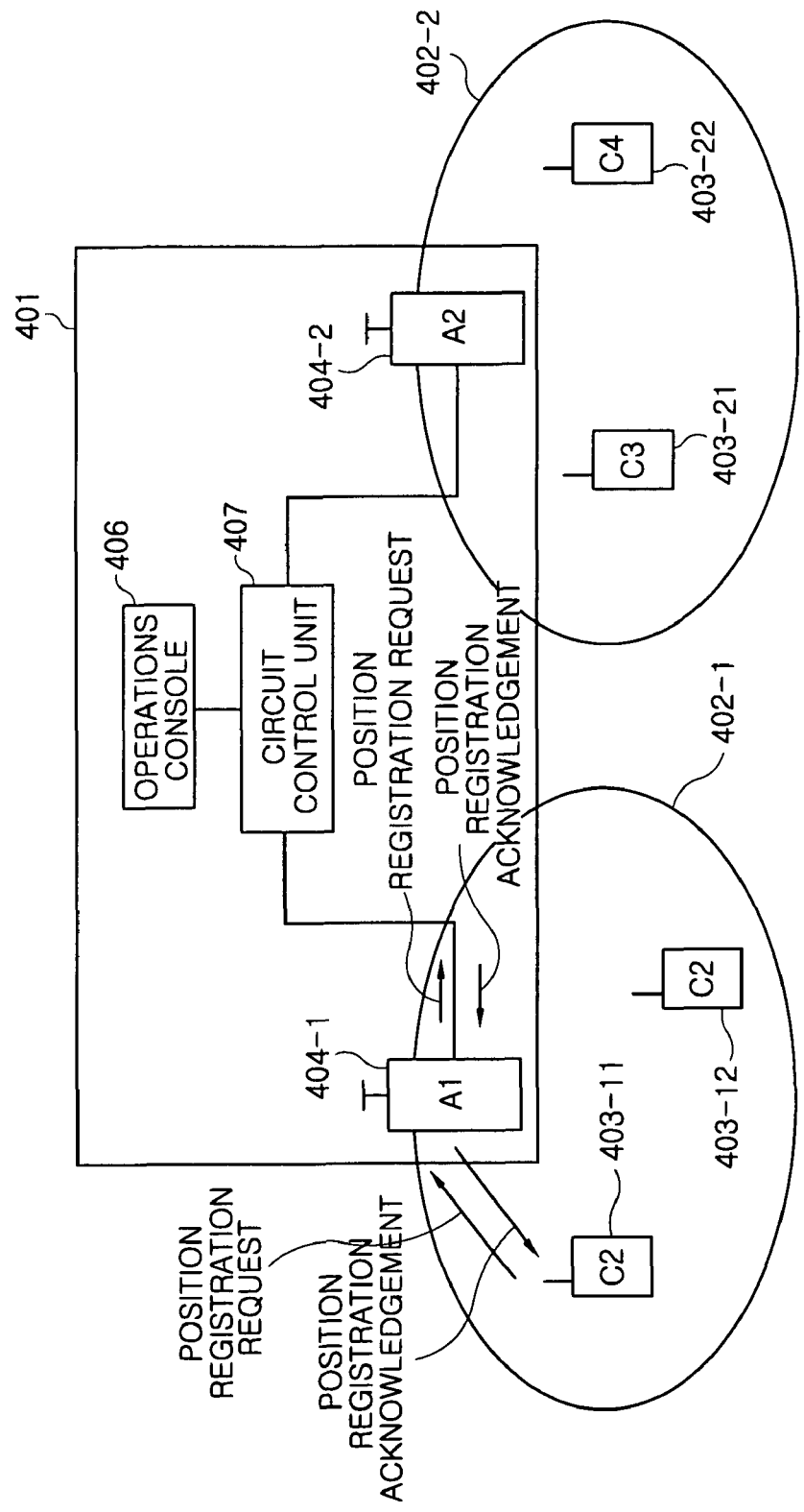

FIG.4B

| MOBILE STATION NUMBER | BASE STATION NUMBER |
|---|---|
| C1 | A1 |
| C2 | A1 |
| C3 | A2 |
| C4 | A2 |

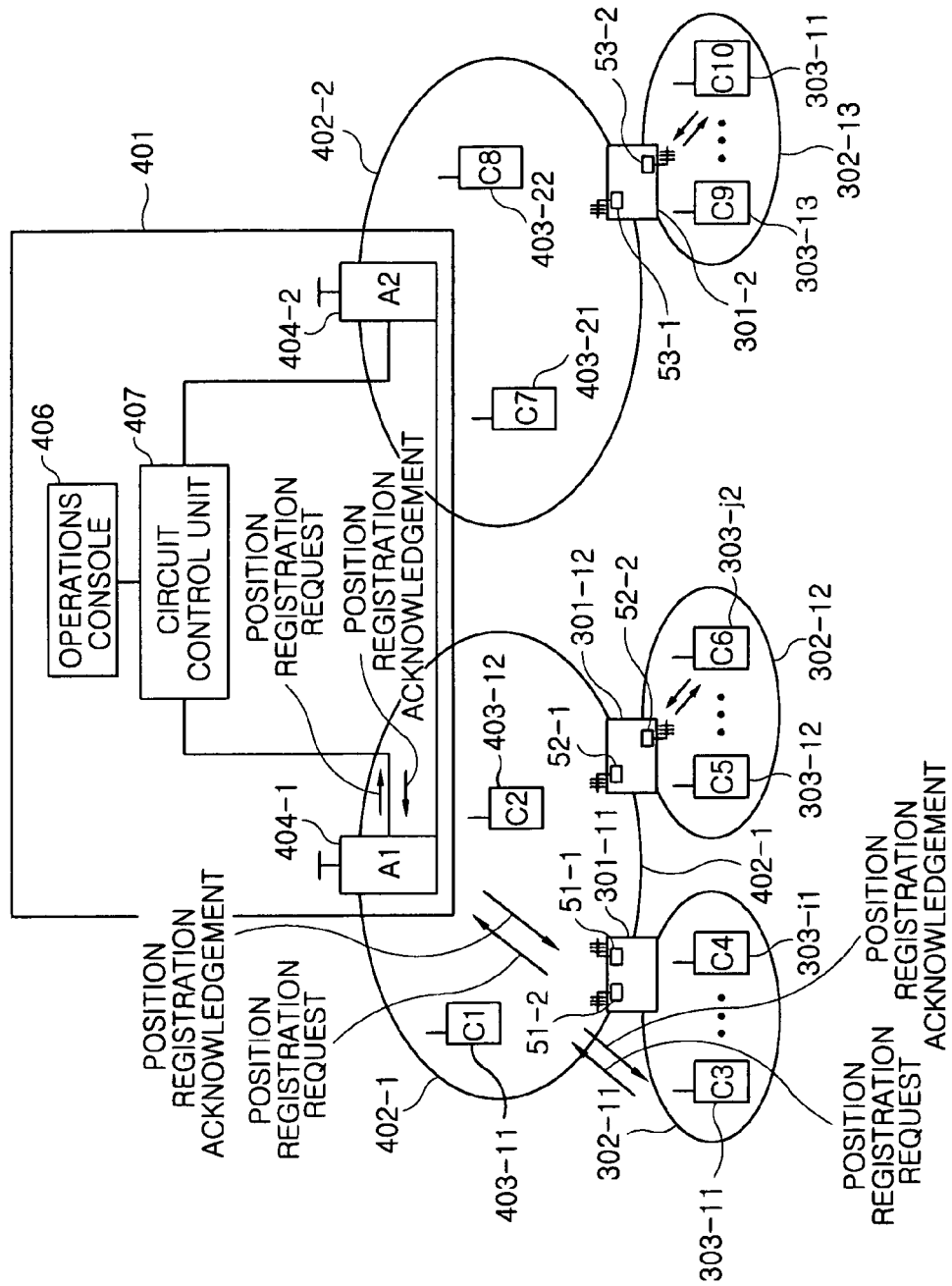

FIG.5B

| MOBILE STATION NUMBER | BASE STATION NUMBER |
|---|---|
| C1 | A1 |
| C2 | A1 |
| C3 | A1 |
| C4 | A1 |
| C5 | A1 |
| C6 | A1 |
| C7 | A2 |
| C8 | A2 |
| C9 | A2 |
| C10 | A2 |

MOBILE COMMUNICATIONS SYSTEM

FIELD OF THE INVENTION

The present invention relates to a digital radio communications system and, more particularly, to a mobile communications system for use in national or municipal disaster prevention.

BACKGROUND OF THE INVENTION

Referring FIGS. 1 to 3, description will be made on a conventional national emergency management information system, e.g., a digital mobile communications system for local government (Association of Radio Industries and Businesses (ARIB) standards no.: STD-T79). Further, in the drawings, same components having similar functions are designated by same alphanumeric references and description thereof will be omitted.

The conventional mobile communications system for national or municipal disasters prevention in which one local government serves as a basic unit includes a control station, a base station and a mobile station (see, e.g., Japanese Patent Application Publication No. 2006-100911). Generally, a mobile communications system includes a plurality of base stations, a relay station (relay terminal station), a plurality of mobile stations. However, description will be made on an example of a system having a minimum configuration for simplicity.

FIG. 1 illustrates a schematic configuration of the conventional digital mobile communications system for national or municipal disaster prevention. More specifically, FIG. 1 shows an example of the digital mobile communications system having a minimum configuration, that is, a single base station zone system in which a base station covers operations areas of mobile stations. The reference '101' designates a control station, '102' represents a base station zone, and '103-1, 103-2, 103-3, 103-4, 103-5, 103-6, . . . , 103-n' (n is a natural number) present mobile stations. In the control station 101, 104, 105 and 106-1~106-m designate a control unit, a radio unit and operations console, respectively. In FIG. 1, the base station includes the control unit 104 and the radio unit 105 whose communications area (service area) is included in the base station zone.

Further, the operations consoles 106-1~106-m are connected to each other and to the control unit 104, by network circuits, e.g., local telephones connected to public switched telephone network (PSTN), an intranet, a LAN (Local Area Network), a WAN (Wide Area Network) and/or the like. If there are plural base stations, i.e., a plurality of base station zones, respective control units 104 of the plural base stations are connected to the operations consoles 106-1~106-m.

FIGS. 2A to 2D show views for explaining communication channels related to communications connection services of the mobile communications system shown in FIG. 1.

As shown in FIG. 1, the mobile communications system is configured to provide communications connection service between a plurality of mobile stations 103-1~103-4, 103-6, . . . , 103-n and the control station 101, communications connection service between mobile stations direct or via the control station 101, in the base station zone 102, or communications connection service between the mobile station 103-5 outside the base station zone 102 and the mobile station 103-4 inside the base station zone 102.

FIG. 2A shows configurations of a downlink radio carrier (frequency: f1) and an uplink radio carrier (frequency: f2), each having 4 channels, i.e., three communication channels S1~S3 and a control channel.

For example, if the mobile station 103-4 communicates with the operations console 106-1 of the control station 101 via the control unit 104 and the radio unit 105, the communication channel S2 is set as a communication channel, as shown in FIG. 2C. For example, if the mobile station 103-1 communicates with the mobile station 103-2 via the control unit 104 and the radio unit 105, the communication channel S1 is set as a communication channel, as shown in FIG. 2B.

Further, the mobile station 103-4 may communicate with the mobile station 103-5 located outside the base station zone 102, i.e., the communications area (service area) covered by the base station, without passing through, the base station or the control station 101. In such a case, a radio carrier having frequency f3 is set as a communication channel, as shown in FIG. 2D.

FIG. 3 illustrates a schematic configuration of a digital mobile communications system for national or municipal disaster prevention in accordance with another conventional example. When compared to the mobile communications system shown in FIG. 1, there are additionally provided a relay terminal station and a relay terminal zone. References 103', 301, 302 and 303-1~303-k (k is a natural number) designate a fixed station, a relay terminal station, a relay terminal zone, and mobile stations in the relay terminal zone 302, respectively. Hereinafter, a mobile station 103 refers to the mobile stations 103-1, 103-2, 103-3, . . . , 103-n and a operations console 106 refers to the operations consoles 106-1~106-m.

The radio terminal station 301 temporarily or constantly covers a dead zone, i.e., an area outside the base station zone 102 in a service area of the base station radio relay to provide communications services. Further, the relay terminal station includes an inter-base station relay terminal station for relaying between a base station communications carrier and another base station communications carrier, and a direct communications relay terminal station for relaying between a base station communications carrier and an inter-mobile station direct communications carrier. The relay terminal station 301 shown in FIG. 3 serves as the direct communications relay terminal station.

In FIG. 3, the mobile station 103, the fixed station 103' and the relay terminal station 301 send data to the radio unit 105 of the base station via an uplink radio carrier (frequency: f2) and the radio unit 105 of the base station send data to the mobile station 103, the fixed station 103' or the relay terminal station 301 by using a downlink radio carrier (frequency: f1). In the relay terminal zone 302, the mobile stations 303-1~303-k send data to and receive data from each other via the relay terminal station by using a radio carrier (frequency: f3).

In the case of the mobile communications system shown in FIG. 1, the mobile stations 303-1~303-k located outside the base station zone 102 cannot communicate with the control station 101 or the mobile station 103 or fixed station 103' inside the base station zone 102 via the base station. However, in the mobile communications system in which the relay terminal station 301 is provided as shown in FIG. 3, the mobile stations 303-1~303-k in the relay terminal zone 302 can communicate with the mobile station 103 or the fixed station 103' in the base station zone 102 via the relay terminal station 301 and the base station.

In the above-described conventional examples, the mobile station in the base station zone sends a ⌈position registration request⌋ signal to the control station at a constant time period upon and after starting to operate. At this point, if the mobile station is allowed to use in the mobile communications system, i.e., the mobile station has been already registered or newly registration is completed, a ⌈position registration acknowledgement⌋ signal is returned and, accordingly, the mobile station, becomes able to make a call.

Further, the control station can identify a base station zone to which the mobile station belongs by such position registration thereof and then, upon making a call to the mobile station, send a call signal via the identified base station. As the above, the control station reduces radio traffics between a circuit control unit and a base station, and a base station and a mobile station, by identifying a base station zone to which the mobile station belongs.

However, mobile stations outside the base station zone (an area outside a communications area of the base station, i.e., a dead zone) or in a direct communications state cannot perform a position registration and, therefore, the control station cannot identify these mobile stations. Further, in the mobile communications system in which a relay terminal station is provided, mobile stations located in the relay terminal zone do not perform a position registration because it operates by using a direct communication protocol.

That is, in the mobile communications system including a plurality of base stations and a relay terminal station, it is impossible to identify which base station zone the mobile station in the radio terminal zone belongs to. For that reason, if a call is made to a mobile station located in the radio terminal zone, the control station cannot decide which base station a call signal is sent through. In order to solve this problem, a mobile communications system may send a call signal through all the base station, which can eliminates need for position registration.

In such case, however, there occur problems, e.g., traffic increase between the control station (circuit control) and the base station, and/or unnecessary use of the radio circuit. Further, there also occurs a problem that the control station (operations manager) cannot manage conditions of the mobile station (power on/off, which base station the mobile station belongs to)

SUMMARY OF THE INVENTION

In view of the above, the present invention provides a mobile communications system including a plurality of base stations and a plurality of relay terminal stations in which a mobile station located in a relay terminal zone of a relay terminal station can perform a position registration to a control station via the relay terminal station.

In accordance with an aspect of the present invention, there is provided a mobile communications system including a control station that identifies a base station zone serving as a communications area of a base station and performs position registration of first mobile stations which belongs to the base station; and a relay terminal station that relays radio communications between the base station and a second mobile station, the second mobile station being located outside the base station zone and inside a relay terminal zone serving as a communications area of the relay terminal station. In the mobile communications system in accordance with the present invention, the second mobile station sends a position registration request signal to the base station via the relay terminal station; the base station receives the position registration request signal and transfers the received position registration request signal to the control station; and, after completing the position registration of the second mobile station based on the position registration request signal, the control station sends a position registration acknowledgement signal to the second mobile station via the base station and the relay terminal station.

Effects of the Invention

With the mobile communications system of the present invention, the mobile station located in a relay terminal zone can perform a position registration and, accordingly, the control station can identify mobile stations located in the relay terminal zone. Therefore, it is possible to reduce an amount of communications traffic.

BRIEF DESCRIPTION OF THE DRAWINGS

The objects and features of the present invention will become apparent from the following description of preferred embodiments, given in conjunction with the accompanying drawings, in which:

FIGS. 4A and 4B represent views for conceptually explaining a position registration of a mobile station;

FIGS. 5A and 5B show views for conceptually explaining a method for making a call to a mobile station in accordance with an embodiment of the present invention;

DETAILED DESCRIPTION OF THE PREFERRED EMBODIMENTS

Figure 1:
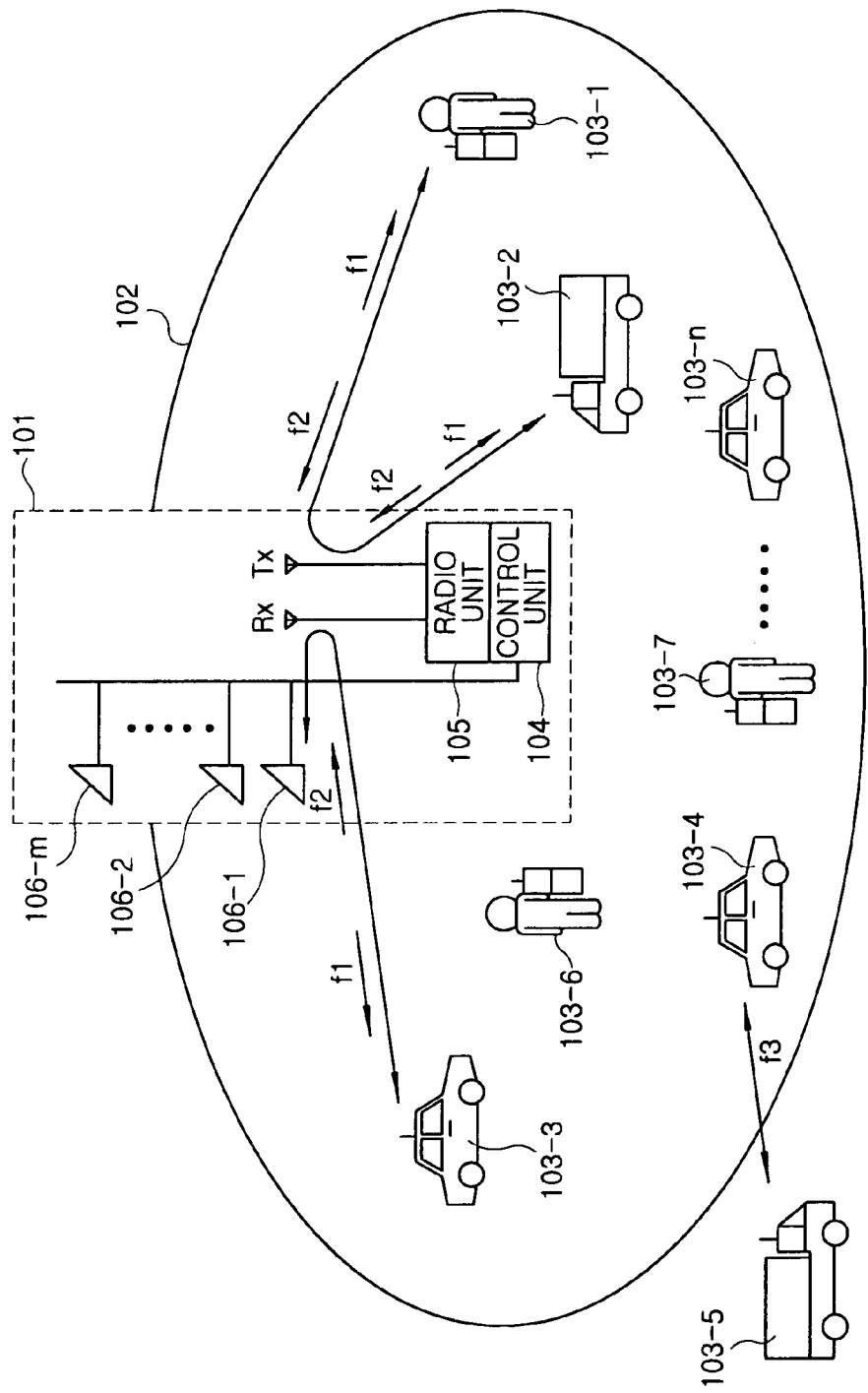
FIG. 1 shows a schematic configuration of a digital mobile communications system for national or municipal disaster prevention in accordance with a conventional example.

Hereinafter, embodiments of the present invention will be described in more detail with reference to accompanying drawings which form a part hereof.

Embodiments described herein are just examples for explanation, and do not limit a scope of the present invention. Further, it will be understood by those skilled in the art that a part of or all components in the embodiments may be replaced by equivalents thereof, which are also included in the present invention. Although a storage unit, e.g., memories or the like, is not depicted in apparatuses shown in each drawing, it is obvious that there is a storage unit such as a memory in which software for system operations and/or data are stored.

Hereinafter, schematic description will be made on a position registration of a mobile station with reference to FIGS.

4A and 4B. FIG. 4A shows a schematic configuration for conceptually explaining a position registration of a mobile station in a mobile communications system having two base stations (i.e., two base station zones). FIG. 4B shows an example of position registration information of the mobile station. There are provided a control station 401, base station zones 402-1 and 402-2, mobile stations 403-11, 403-12, 403-21 and 403-22, base stations 404-1 and 404-2, a operations console 406 and a circuit control unit 407.

Referring to FIG. 4A, when starting to operate, the mobile station (mobile station number: C1) 403-11 and the mobile station (mobile station number C2) 403-12 located in the base station zone 402-1 of the base station (base station number: A1) 404-1 send respective position registration request signals to the control station 401. After the position registration, each of them sends a position registration request signal to the control station 401 at a certain time period T. The sent position registration request signal is received by the base station 404-1 of the base station zone 402-1 to which each of them belongs and data thereof are transmitted to the circuit control unit 407.

The circuit control unit 407 determines whether or not a mobile station identifying, information (e.g., a mobile station number ID given to every mobile station) included in the data of the position registration request has already been registered in a table of position registration information as shown in FIG. 4B. If the mobile station identifying information is not registered, the circuit control unit 407 newly registers the base station number along with the name of the mobile station and, if otherwise, updates the base station number with a base station number to which the mobile station sending the position registration request belongs.

Preferably, time information when the position registration request is sent or received is registered together with the position registration information. In the example shown in FIG. 4B, the information identifying the base station is a base station number, e.g., identification (ID) given to every base station. For example, IDs of the base stations 404-1 and 404-2 are A1 and A2, respectively.

The circuit control unit 407 registers (newly or updates) the position registration information in the table and then returns a position registration acknowledgement signal to the base station 404-1. The base station 404-1 transfers the position registration acknowledgement signal to the corresponding mobile station 403-11 and thus the mobile station 403-11 receives the position registration acknowledgement signal.

Whenever the circuit control unit 407 receives a position registration request signal, updates the table of position registration information and sends a position registration acknowledgement signal, the circuit control unit 407 outputs notification information to the operations console 406, the notification information notifying the operations console 406 that there was a position registration request. The operations console 406 includes an output unit (e.g., a display unit), not shown, through which the operator can read contents of the position registration information table, whether or not there were a position registration request signal and a position registration acknowledgement signal, and a history thereof, if necessary.

When the mobile stations 403-11 and 403-12 are allowed to use in the mobile communications system, i.e., the mobile stations 403-11 and 403-12 are already registered or the position registration is completed, respective ⌈position registration acknowledgement⌋ signals are returned and each of the mobile stations 403-11 and 403-12 becomes possible to make/receive a call. The above description can be equally applied to the mobile stations 403-21 and 403-22 in the base station zone 402-2. Consequently, the position registration information is registered in a form of table as shown in FIG. 4B in the circuit control unit 407 and the control station 401 can identify the base stations and base station zones to which the mobile stations 403-11, 403-12, 403-21 and 403-22 belong, respectively, by referring to the registration information registered.

Next, procedures for making a call in accordance with an embodiment of the present invention will be described with reference to FIGS. 5A and 5B. Relay terminal stations 301-11 and 301-12 are provided in a base station zone 402-1 of a base station 404-1 and a relay terminal station 301-2 is provided in a base station zone 402-2 of a base station 404-2. The relay terminal stations 301-11, 301-12 and 301-2 have relay terminal zones 302-11, 302-12 and 302-13, respectively. Mobile stations 303-11, . . . , 303-$i$1 are located in the relay terminal zone 302-11, mobile stations 303-12, . . . , 303-$j$2 are located in the relay terminal zone 302-12, and mobile stations 303-13, . . . , 303-$l$1 are located in the relay terminal zone 302-13. Herein, i, j and l are natural numbers.

Further, the relay terminal station 301-11 includes a base carrier radio unit 51-1 communicating with the base station 404-1 and a direct carrier radio unit 51-2 communicating with a mobile station in the relay terminal zone 302-11. The relay terminal station 301-12 includes a base carrier radio unit 52-1 communicating with the base station 404-1 and a direct carrier radio unit 52-2 communicating with a mobile station in the relay terminal zone 302-12. The relay terminal station 301-2 includes a base carrier radio unit 53-1 communicating with the base station 404-2 and a direct carrier radio unit 53-2 communicating with a mobile station in the relay terminal zone 302-13.

In FIG. 5A, the mobile station (mobile station number: C1) 403-11, the mobile station (mobile station number: C2) 403-12, the mobile station (mobile station number: C7) 403-21 or the mobile station (mobile station number: C8) 403-22 perform a position registration process to the control station 401 at a certain period T upon and after starting to operate, as described with reference to FIGS. 4A and 4B.

Further, the mobile station (mobile station number: C3) 303-11, . . . , or the mobile station (mobile station number: C4) 303-$i$1 sends a position registration request signal to the relay terminal station 301-11 on starting to operate. After the position registration (receiving the position registration acknowledgement signal), the mobile stations 303-11, . . . , or 303-$i$1 sends a position registration request signal to the relay terminal station 301-11 at a certain time period T.

When the relay terminal station 303-11 receives a position registration request signal from one of the mobile stations 303-11, . . . , 303-$i$1 in the relay terminal zone 302-11, the relay terminal station 303-11 transfers the received position registration request signal to the base station 404-1 of the base station zone 402-1 to which it belongs. When receiving the position registration request signal, the base station 404-1 transmits data of the received position registration request signal to the circuit control unit 407.

The circuit control unit 407 reads information specifying a mobile station, e.g., a mobile station number given to every mobile station as identification, from the data of the received position registration request signal and determines whether or not the mobile station number is already registered in the position registration information table shown in FIG. 5B. If the mobile station number is not registered in the position registration information table, the circuit control unit 407 newly registers the mobile station number along with the base station number. If otherwise, the circuit control unit 407 updates the base station number with a base station number to which the mobile station currently belongs. Preferably, a time when the position registration request signal is sent or received is registered together.

After registering (newly registering or updating) the position registration information in the table, the circuit control unit 407 returns a position registration acknowledgement signal to the relay terminal station 301-11 via the base station 404-1. The relay terminal station 301-11 sends the received position registration acknowledgement signal to the mobile station 303-11 in the relay terminal zone 302-11. The mobile station 303-11 can confirm that the position registration is completed by receiving the position registration acknowledgement signal.

When the circuit control unit 407 receives the position registration request signal, updates the position registration information table and sends the position registration acknowledgement signal, the circuit control unit 407 outputs notification information to the operations console 406, thereby notifying the operations console 406 that there was a position registration request. The operations console 406 may output the position registration information table, whether or not there were a position registration request signal and a position registration acknowledgement signal, and a history thereof to the output unit (e.g., display unit) not shown, in response to a request from the operator.

As described above, if the position registration of the mobile station is completed in the mobile communications system and the mobile station is allowed to use, a ⌈position registration acknowledgement⌋ signal is returned so that the mobile station 303-11 can make a call. The above description is equally applied to the other mobile stations 303-21, . . . , 303-i1 in the relay terminal zone 302-11 and the other mobile stations 303-12, . . . , 303-j2 in the relay terminal zone 302-12. Further, it is equally applied to the other mobile stations 303-13, . . . , 303-l1 in the relay terminal zone 302-13 of the relay terminal station 301-2 which belongs to another base station zone 402-2.

As a result, in the circuit control unit 407 of the control station 401, the position registration information is registered in the table, as shown in FIG. 5B. Conventionally, it has been impossible for the control station to locate mobile stations, e.g., C3~C6, C9 and C10 which belong to relay terminal stations, e.g., 301-11, 301-12 and 301-2. With the embodiment in accordance with the present invention, however, the control station can check the registered position registration information with respect to a mobile station, and know which base station the mobile station located in the relay terminal station belongs to. Therefore, the control station can communicate with the mobile station in the relay terminal zone via the base station to which it belongs.

Figure 2A:
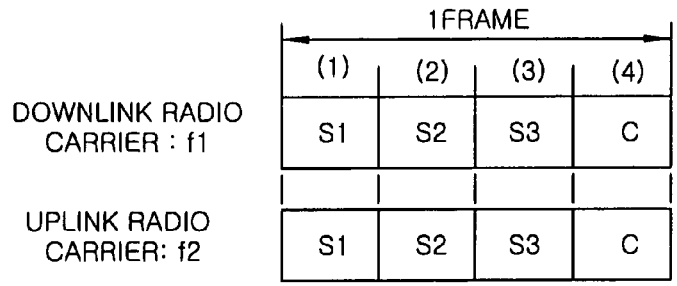
FIGS. 2A to 2D present views for explaining communication channels related to communications connection services of a mobile communications system.
Figure 2B:
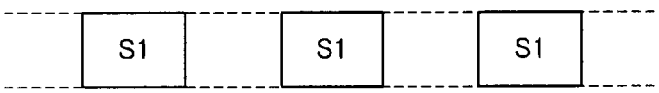
Figure 2C:
Figure 2D:
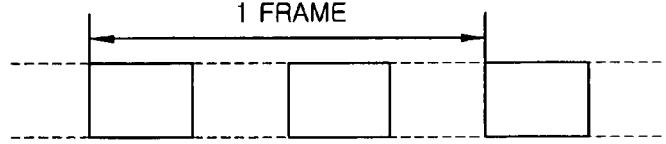

Meanwhile, the control channels mentioned with reference to FIG. 2A include a common access channel (CAC) and a user specific channel (USC) of traffic channel (TCH). The common access channel (CAC) is used for a circuit connection control or the like. The lithe specific channel (USC) is used for transmitting user information, e.g., call voice, data, facsimile data or the like. The base station allocates the user specific channel and the common access channel individually to respective mobile stations by using a known technology (see, e.g., Japanese Patent Application Publication No. 2005-176336 filed by same inventors with the present invention).

Figure 6A:
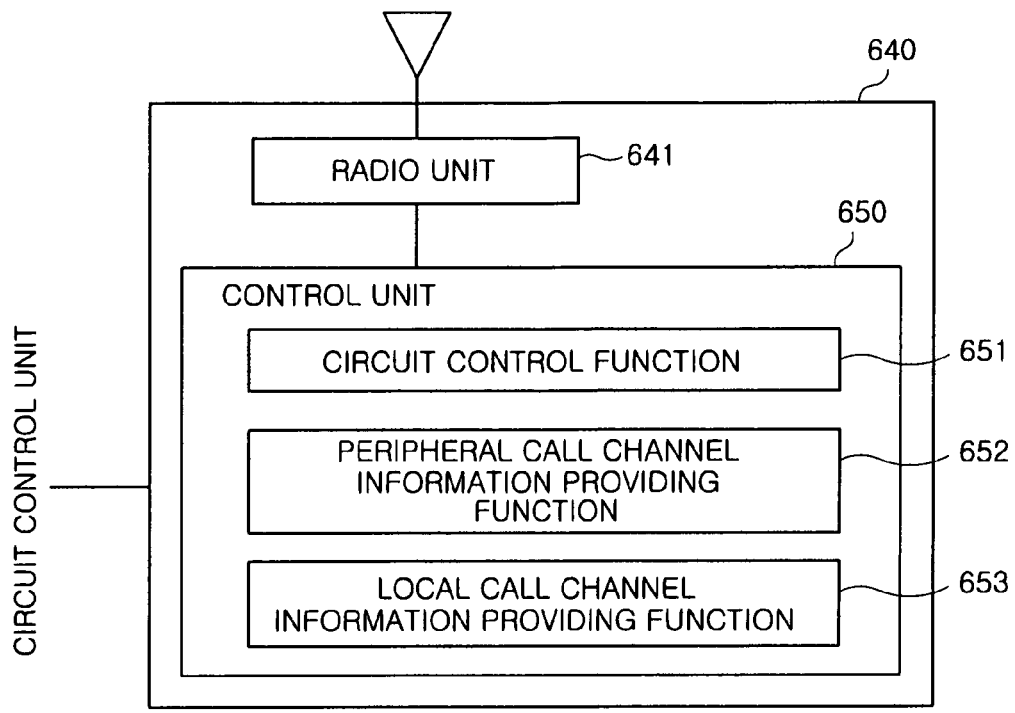
FIG. 6A schematically illustrates a configuration of a base station.
Figure 6B:
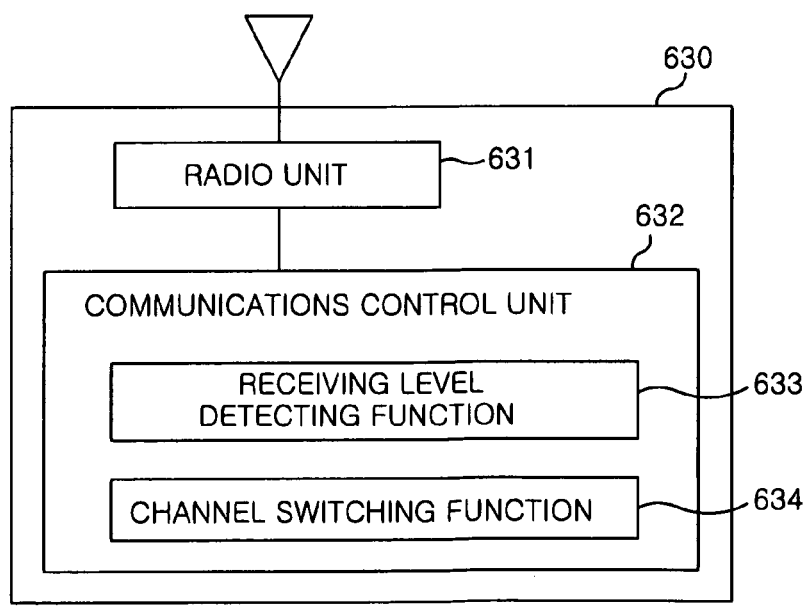
FIG. 6B depicts a schematic configuration of a mobile station.
Figure 6C:
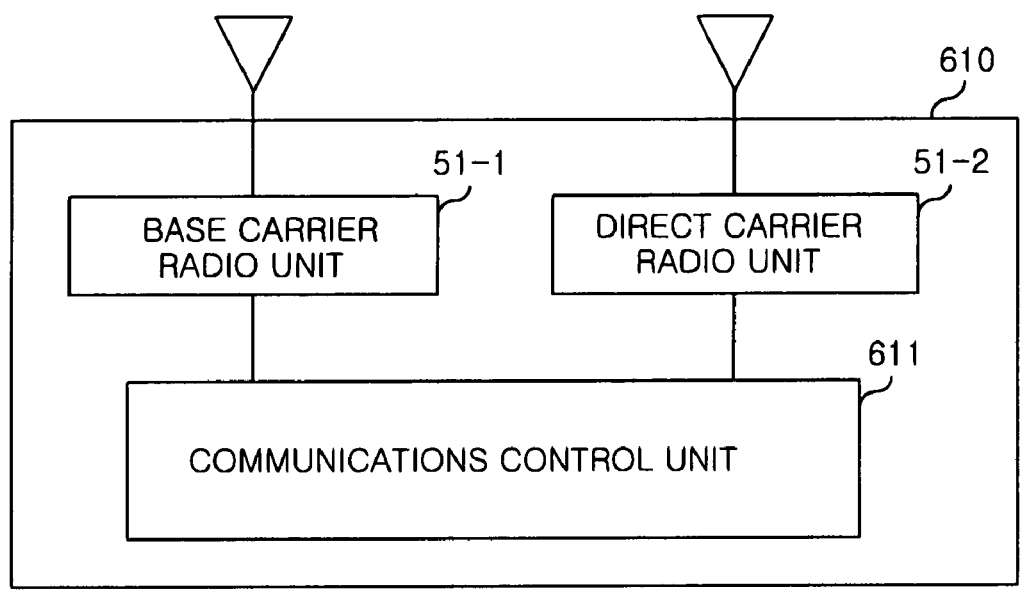
FIG. 6C schematically presents a configuration of a relay terminal station.
Figure 7:
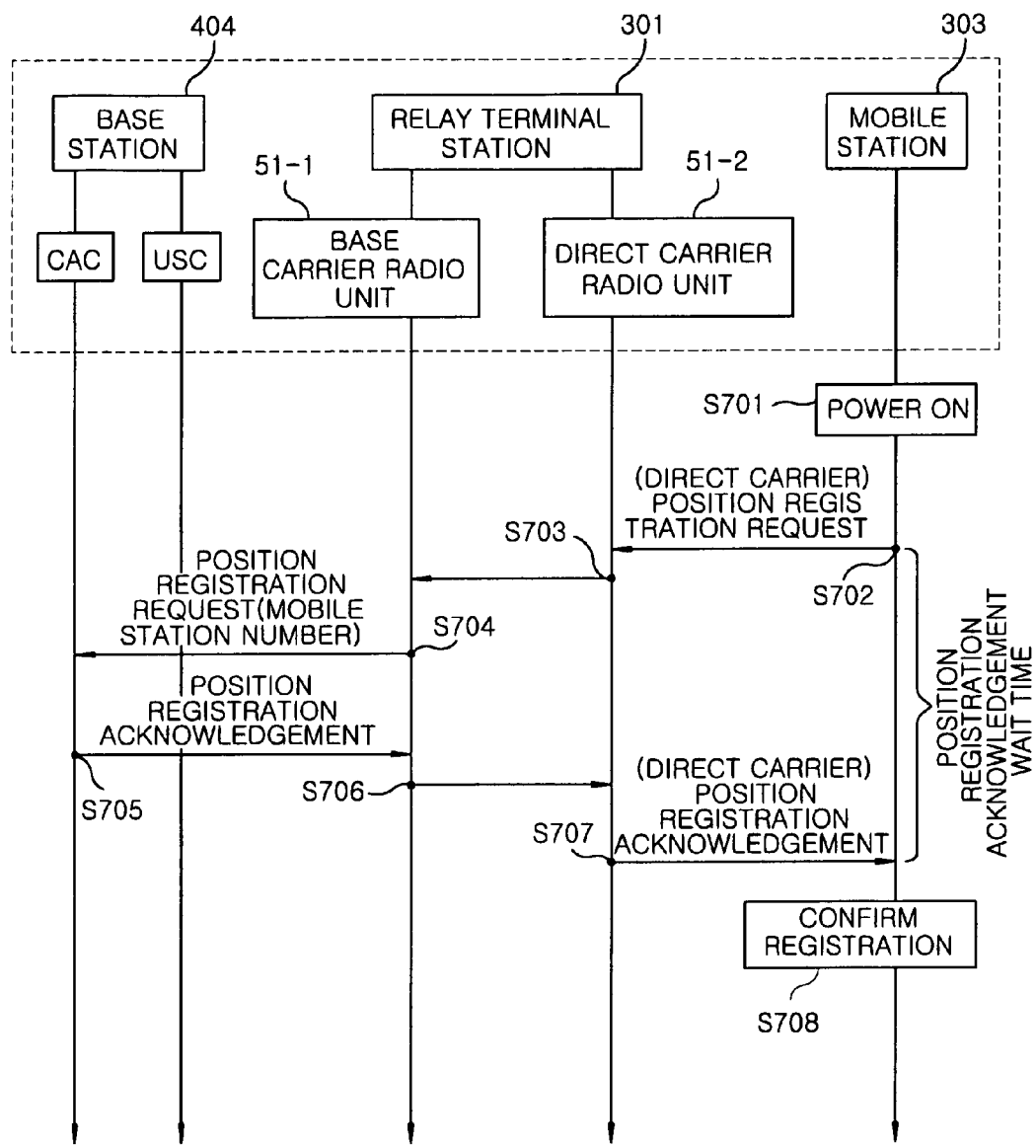
FIG. 7 illustrates a sequence view for explaining a position registration of a mobile station in accordance with another embodiment of the present invention.

Referring to FIGS. 6A to 7, description will be made in detail on procedures that a mobile station in a relay terminal zone performs a position registration.

FIGS. 6A to 6C illustrate schematic configurations of a base station, a mobile station and a relay terminal station, respectively. In FIGS. 6A to 6C, 640 designates a base station, and 641 and 650 designate a radio unit and a control unit thereof, respectively. 651, 652 and 653 denote a circuit control function unit, a peripheral call channel information providing function unit and a local call channel information notifying function unit of the control unit 650, respectively.

Further, 630 designates a mobile station, and 631 and 632 denote a radio unit and a communications control unit thereof. 633 and 643 designate a receiving level detecting function unit and a channel switching function unit of the communications control unit 632. In addition, 610, 611, 51-1 and 51-2 designate a relay terminal station, a communication control unit, a base carrier radio unit and a direct carrier radio unit, respectively.

As shown in FIGS. 6A to 6C, the base station 640 includes the radio unit (radio apparatus) 641 for performing a radio communications process between the mobile station 630 and the relay terminal station 610 in a base station zone, and the control unit 650 for controlling the radio communications process. The control unit 650 includes a circuit control function unit 651, a peripheral call channel information providing function unit 652 and a local call channel information notifying function unit 653. Herein, the control unit 650 of the base station 640 is functionally linked with the circuit control unit 407 (see FIG. 5A).

It is the circuit control unit 407 that substantially controls a communications circuit between the base station 640 and the mobile station 630. The circuit control function 651 of the base station 640 is controlled by the circuit control unit 407. Accordingly, the circuit control may be performed by only the circuit control unit 407 and the base station 640 may not include the circuit control function 651.

Radio communications among the base station 640 and, the mobile station 630 and the relay terminal station 610 in the base station zone are performed by using the communication channels S1-S3 as a channel for communication. The local call channel information notifying function unit 653 retrieves an available communication channel (e.g., communication channel S1-S3 shown in FIG. 2A) which can be allocated to a call voice communications in the local base station 640.

Further, the local call channel information notifying function unit 653 sends traffic channel information of the local base station including frequency information related to an available communication channel, slot information, and transmission power specifying information of the mobile station 630, or the like to the other base stations via the circuit control unit 407.

In addition, traffic channel information of the peripheral base stations specifying the user specific channel available in communicating the call voice from the other base stations to the mobile station 630 is transmitted to the base station 640. The peripheral call channel information providing function unit 652 of the base station 640 notifies the mobile station in the local base station zone of the traffic channel information of the peripheral base stations obtained from the other base stations.

Meanwhile, the relay terminal station 610 receives a transmission signal from the base station 640 with the base carrier radio unit 51-1 and sends the transmission signal received with the base carrier radio unit 51-1 to a certain mobile station in the local relay terminal zone via the communication control unit 611. Further, the relay terminal station 610 receives a signal transmitted from a mobile station in the local relay terminal zone by the direct carrier radio unit 51-2, and sends the signal to the base station 640 via the communication control unit 611. Herein, configuration of the mobile station in the relay terminal zone is same as that shown in FIG. 6B.

FIG. 7 shows a process sequence for explaining a position registration of a mobile station in accordance with an embodiment of the present invention. In the process sequence shown in FIG. 7, a horizontal direction represents a same time point and a downward vertical direction represents time progressing direction. For example, the base station 404, the relay terminal station 301 and the mobile station 303 represent base stations, relay terminal stations and mobile stations in the relay terminal zone of the relay terminal station 301, respectively. Further, the base carrier radio unit 51-1 represents the base carrier radio unit communicating with the base station 404 of the relay terminal station 301 and the direct carrier radio unit 51-2 represents the direct carrier radio unit communicating with the mobile station 303 in the relay terminal zone of the relay terminal station 301.

Hereinafter, descriptions will be made on a process of the common access channel (CAC) in the base station 404 and processes of the base carrier radio unit 51-1 communicating with the base station 404 in the relay terminal station 301 and the direct carrier radio unit 51-2 communicating with the mobile station 303 in the relay terminal zone of the relay terminal station 301.

In step S701, the mobile station 303 is turned on. The turn-on of the mobile station includes a case in which the radio unit and the communication control unit of the mobile station 303 starts to operate and a case in which the mobile station 303 enters the relay terminal zone of the relay terminal station 301 shown in FIG. 7 while being turned on. Normally, the relay terminal station 301 periodically sends a sync signal to mobile stations in its own relay terminal zone. The mobile station 303 receives the sync signal and perceives that it enters the relay terminal zone of the relay terminal station 301.

In step S702, the mobile station 303 sends a position registration request signal. The relay terminal station 301 receives the position registration request signal via the direct carrier radio unit 51-2.

In step S703, the received position registration request signal is notified to the base carrier radio unit 51-1. In step S704, the received position registration request signal is sent to the base station 404 by the base carrier radio unit 51-1.

The base station 404 sends the position registration request signal to the circuit control unit and receives a position registration acknowledgement signal from the circuit control unit as described above.

In step S705, the base station 404 sends the received position registration acknowledgement signal to the base carrier radio unit 51-1 of the relay terminal station 301. In step S706, the base carrier radio unit 51-1 notifies the direct carrier radio unit 51-2 of the received position registration acknowledgement signal. In step S707, the direct carrier radio unit 51-2 of the relay terminal station 301 sends the received position registration acknowledgement signal to the mobile station 303. In step S708, the mobile station 303 confirms completion of the position registration by receiving the position registration acknowledgement signal. Thus, a mobile station located in the relay terminal zone can register its own position.

With this embodiment, a mobile station located in a relay terminal zone can perform a position registration to the control station in the mobile communications system including base stations and relay terminal stations and a relay terminal station can be applied to the mobile communications system requesting a position registration.

That is, with the mobile communications system and method for relaying position registration therein in accordance with the above embodiment of the present invention, the control station can acquire conditions of mobile stations in the relay terminal zone. This makes it possible to reduce communications traffic congestion.

Figure 3:
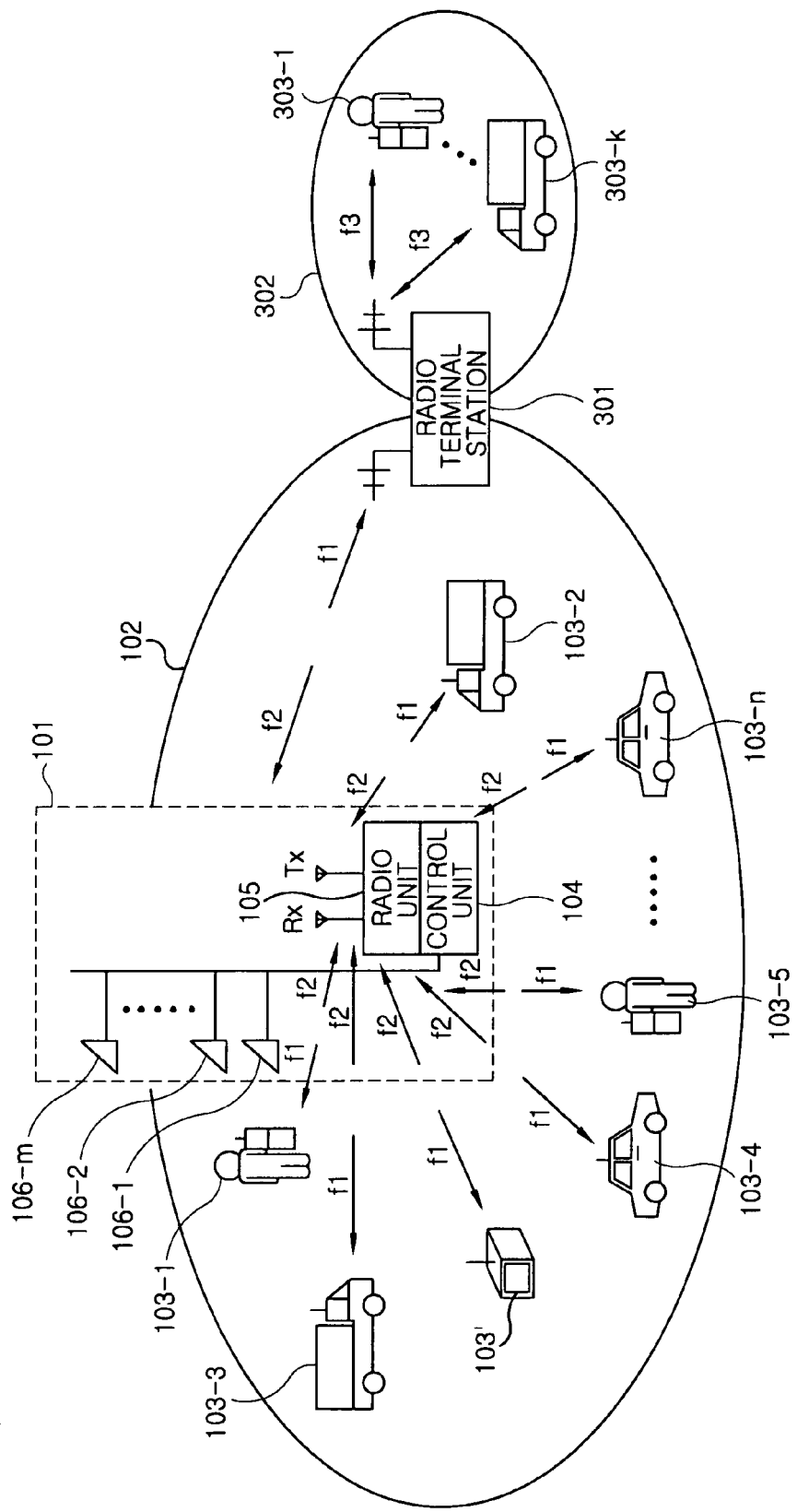
FIG. 3 illustrates a schematic configuration of a digital mobile communications system for national or municipal disaster prevention in accordance with another conventional example.

As described above, the relay terminal station 301 serves to temporarily or constantly cover a dead zone in a service area of the base station, i.e., an area outside the base station zone 102 (see FIG. 3).

On the other hand, if a relay terminal station is temporarily provided, there may occur a case in which lots of non-registered mobile stations exist in the relay terminal zone thereof. Further, even if the relay terminal station is originally provided, a few fire trucks, e.g., may enter a same relay terminal zone at once due to occurrence of a disaster, e.g., fires or the like. In such cases, numerous mobile stations send position registration request signals all at once.

However, communications in the relay terminal zone are performed in a direct communications protocol different from that in the base station zone and the relay terminal station cannot determine whether or not transmission data from the numerous mobile stations collide. In accordance with another embodiment of the present invention, a position registration control is performed in such a way that a collision of position registration requests from the mobile stations can be avoided and circuit traffic of the relay terminal station caused by position registration can be reduced. FIGS. 8A to 8D illustrate flowcharts for explaining another embodiment of the present invention which is related to a position registration control of a mobile station located in the relay terminal zone.

Referring to FIGS. 8A to 8D, the mobile station performs processes (1) to (5) as follows:

(1) Send a position registration request signal after termination of a time set in a random transmission timer, the time being given along with a mobile station number in advance.

(2) Start a position registration acknowledgement wait timer after sending the position registration request signal.

(3) Start a periodic position registration timer when the position registration acknowledgement signal is received. Herein, the periodic position registration timer is set to the time period shorter than the time interval (e.g., 30 minutes, an hour, or the like) that the circuit control unit regularly resets a table of position registration information.

(4) Return to (1) after the position registration acknowledgement wait timer is timed out.

(5) Return to (1) after the periodic position registration timer is timed out.

When each mobile station is numbered, it is given a random transmission time, i.e., a threshold set in a random transmission timer, for transmitting a position registration request signal. For example, the random transmission time may increase from zero second by t1 (an arithmetic sequence) in the order that the mobile station is numbered. for example, t1 may be 0.51 second, 1 second or the like. Alternatively, the difference between the respective random transmission times set in the random transmission timers of the respective mobile stations may be set to a time period longer than the time for a mobile station to receive a position registration acknowledgement signal from the control station after the mobile station transmits a position registration request signal.

Figure 8A:
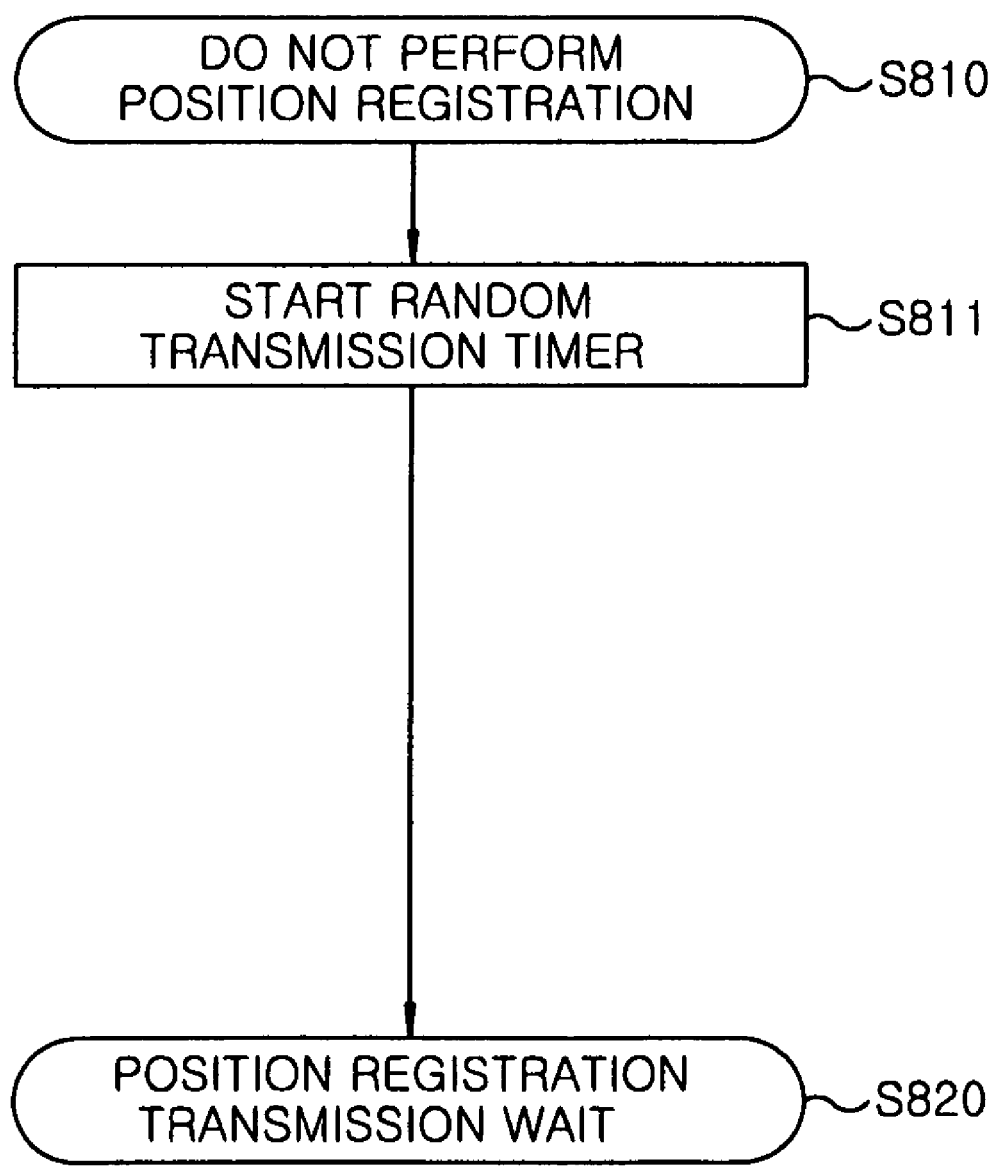
FIGS. 8A to 8D depict flowcharts for explaining processes of the position registration in accordance with an embodiment of the present invention.

Specifically, in step S810 shown in FIG. 8A, a mobile station in a relay terminal zone has not performed a position registration. In step S811, when the mobile station is powered, the random transmission timer starts to operate and, in step S820, the mobile station is waiting to do a position registration.

Figure 8B:
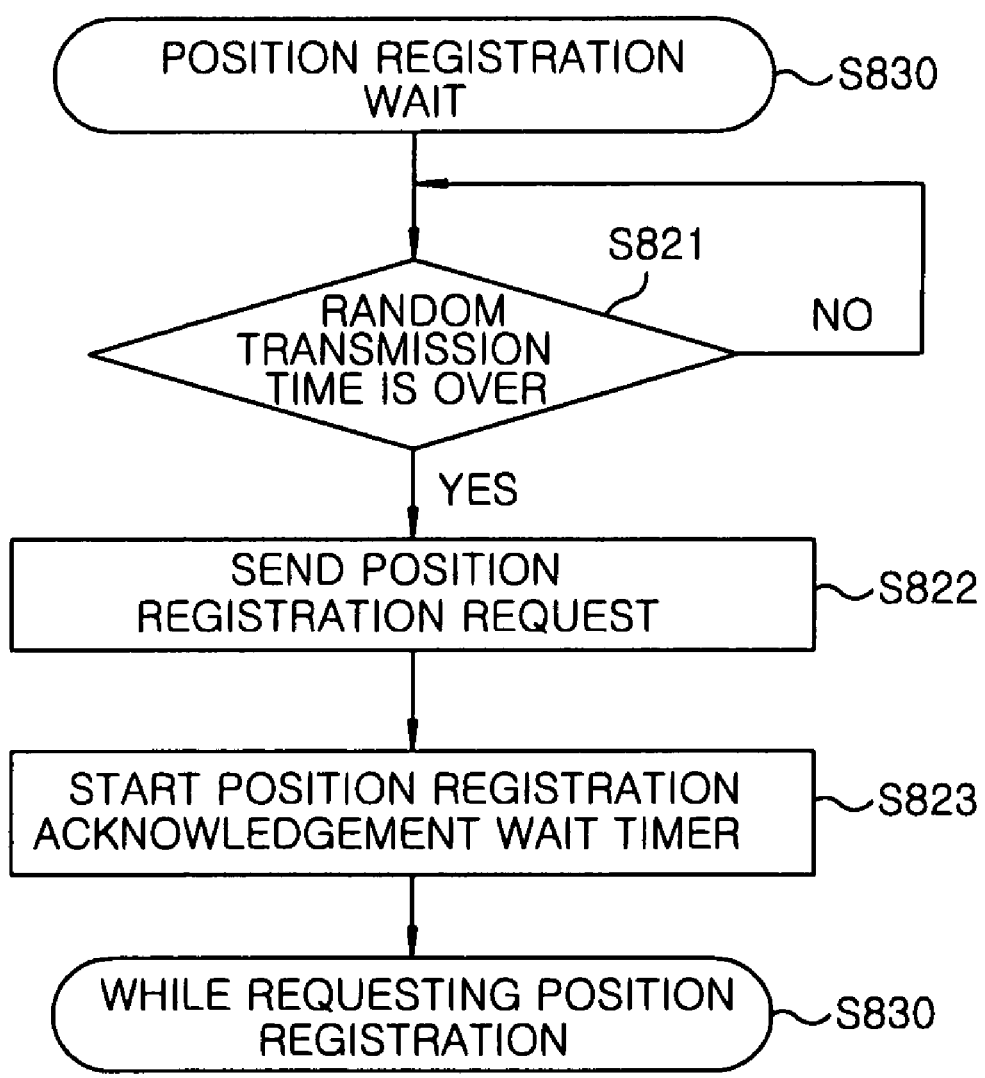

In step S821 shown in FIG. 8B, the mobile station checks whether or not the random transmission timer arrives at the threshold. If the random transmission timer does not reach the threshold, it continues to check whether or not the random transmission time is over in the step S821. When the random transmission timer arrives at the threshold, the process proceeds to next step S822. In the step S822, the mobile station sends a position registration request signal and moves to step S823.

In the step S823, the mobile station starts the position registration acknowledgement wait timer and proceeds to step S830. Herein, a time of the position registration acknowledgement wait timer may be same in all of the mobile stations. Alternatively, the time of the position registration acknowledgement wait timer may vary with ranks depending on a type of each mobile station or a priority of an owner of each mobile station. Further, it may be randomly set in each mobile station.

The step S830 represents a step where the mobile station is requesting the position registration.

Figure 8C:
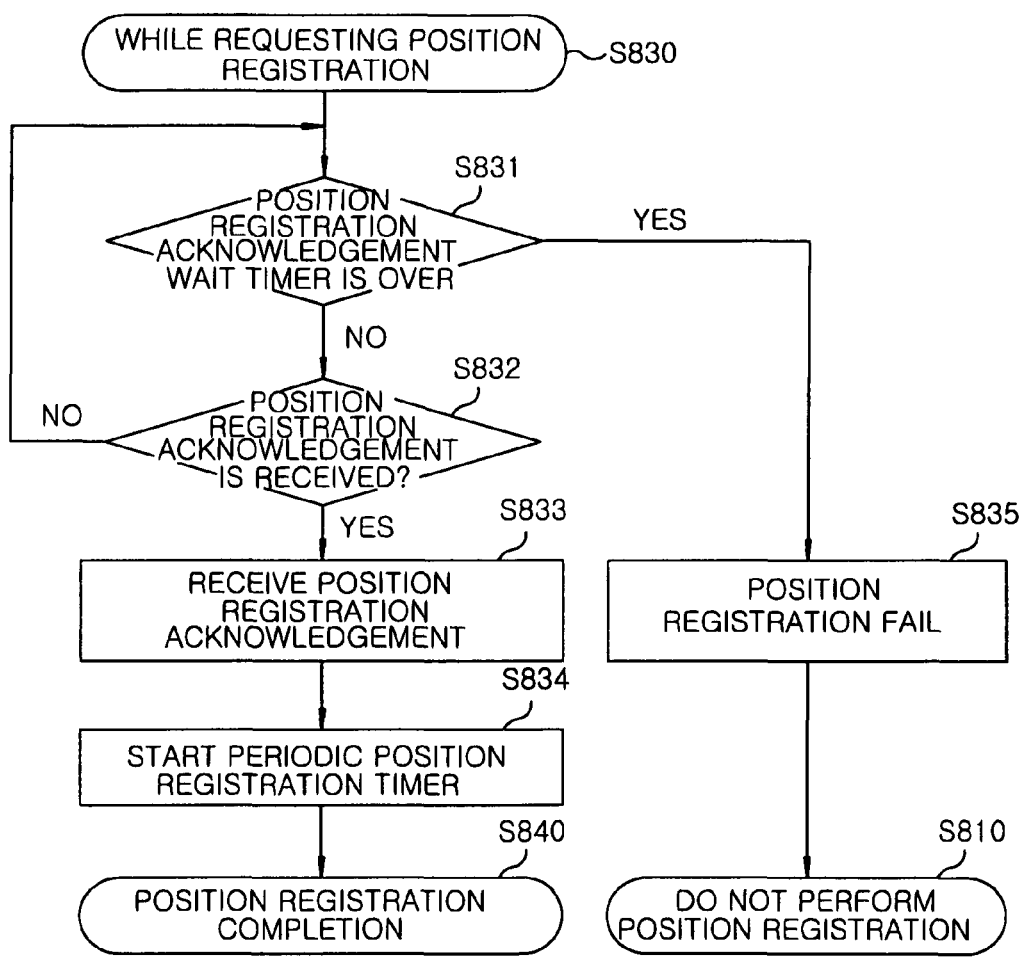
Figure 8D:
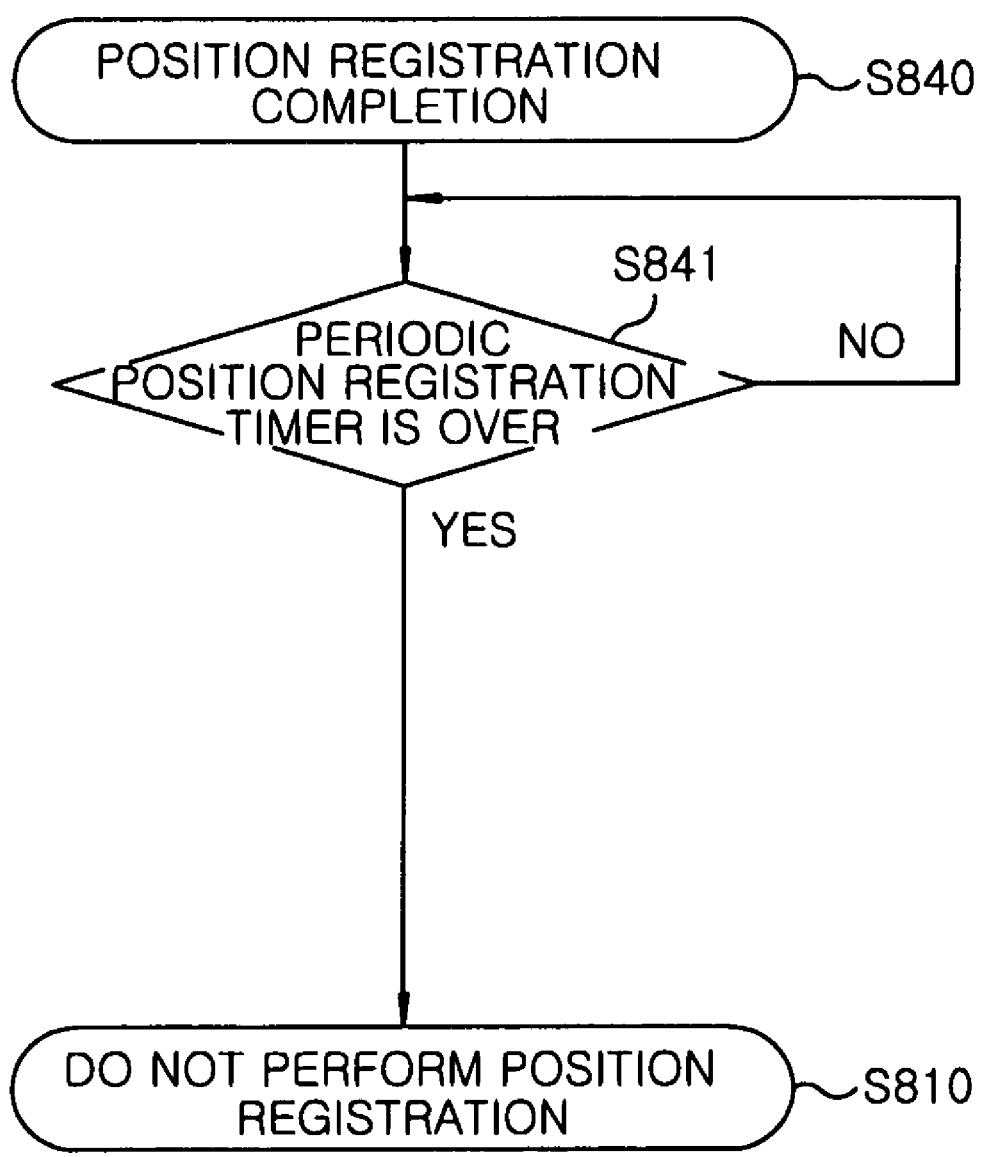

Next, in step S830 shown in FIG. 8C, the mobile station checks whether or not the position registration acknowledgement wait timer reaches a certain threshold. If the position registration acknowledgement wait timer arrives at a certain threshold, the process moves to step S835 and, if otherwise, moves to step S832. In the step S832, the mobile station further checks whether or not the position registration acknowledgement signal is received. If it is not received, the mobile station returns to the step S831 and checks whether or not the position registration acknowledgement wait timer is timed out again. If the position registration acknowledgement signal is received, the mobile station moves to step S833.

In the step S833, the mobile station receives the position registration acknowledgement signal and moves to step S834.

The mobile station starts the periodic position registration timer in step S834. Herein, the periodic position registration timer is set to a predetermined time T after completion of the position registration, i.e., reception of the position registration acknowledgement signal. Further, the predetermined time T may be of a same value in all of the mobile stations. Alternatively, the predetermined time T may vary with ranks depending on a type of each mobile station or a priority of an owner of each mobile station. Preferably, the predetermined time T is set to a time shorter than a time interval for resetting the table of position registration information in the control station.

The step S840 represents a state that the position registration is completed.

Further, when the position registration acknowledgement wait timer reaches the certain threshold in the step S831, the mobile station determines that the position registration is failed in the step S835 and returns to the step S810.

After completion of the position registration in the step S840, the mobile station checks whether or not the periodic position registration time reaches the predetermined time T in the Step S841. If the periodic position registration, timer arrives at the predetermined time T, the process returns to the step S810. If not, the check process of the step S841 is repeated.

Figure 9:
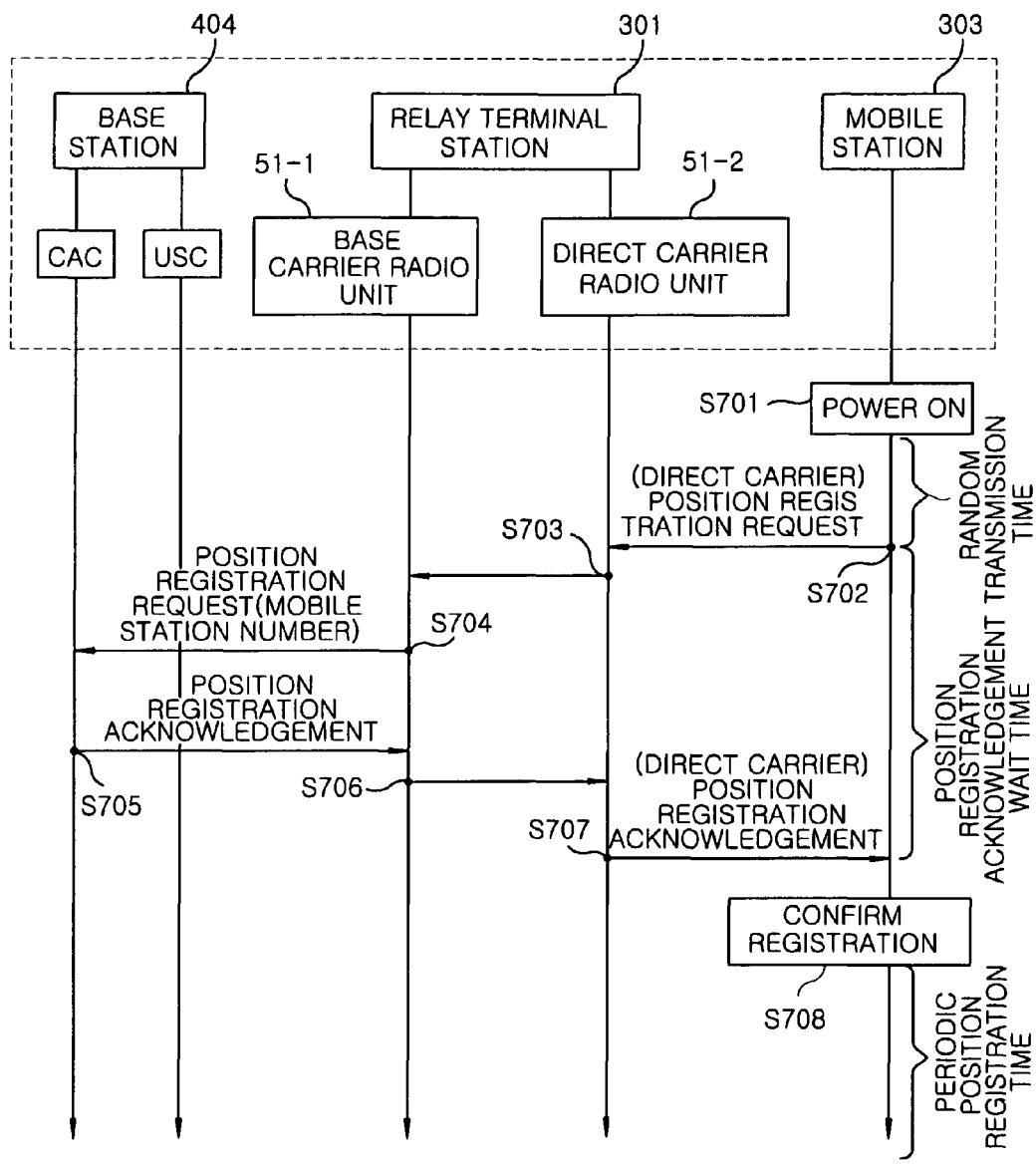
FIG. 9 presents a sequence view for explaining a position registration of a mobile station in accordance with another embodiment of the present invention.

FIG. 9 shows a sequence view for explaining procedures for performing a position registration of a mobile station in accordance with the embodiment of the present invention. When compared to procedures in the sequence view shown in FIG. 7, it is different in that, in the procedures of the sequence shown in FIG. 9, respective mobile stations in a relay terminal zone have their respective random transmission timers and, accordingly, send respective position registration request signals (step S702) after lapse of respective random transmission times from powering to the mobile station (step S701). Further, it is different in that each of the mobile stations starts a periodic position registration timer after receiving a position registration acknowledgement signal and then sends a next position registration request signal after lapse of a periodic position registration time.

In the embodiment shown in FIGS. 8A to 9, there are provided timers in respective mobile stations located in a relay terminal zone of a relay terminal station and, therefore, each of the mobile stations can send a position registration request signal after a random transmission time, thereby preventing a collision of the position registration request signals from the mobile stations. That is, the mobile stations located in the same relay terminal zone will cannot send the position registration request signal all at once in this embodiment. This makes it possible to prevent the position registration request signal sent by each mobile station from colliding, and effectively and quickly perform the position registration.

With this embodiment, since position registrations of respective mobile stations are temporally distributed by setting respective values of the random transmission timer differently for the respective mobile stations, control can be made on the timings of the position registration in addition to the effects achieved by the embodiment shown in FIGS. 4 to 7.

In the embodiment shown in FIGS. 8A to 9, there is provided a position registration acknowledgement timer in order to ensure that a mobile station receives a position registration acknowledgement signal from a base station after transmitting a position registration request signal to the base station. Therefore, since the mobile station can be promptly notified of a failure of the position registration, the mobile station can quickly and effectively perform a position registration again in addition to the effects achieved by the embodiment shown in FIGS. 4 to 7.

As described in embodiments of the present invention shown in FIGS. 4 to 9, there is provided a method for relaying a position registration in a mobile communications system which includes mobile stations; base stations; a control station that identifies a base station zone to which a mobile station belongs at least by a position registration; and relay terminal stations for relaying radio communications between the base station and a direct communications type mobile station located outside the base station zone such that the direct communications type mobile station can communicate with the base station. The method includes sending a position registration request signal in a direct communications protocol to a relay terminal station from a mobile station located in a relay terminal zone thereof; transferring the received position registration request signal to a base station from the relay terminal station; and transmitting the position registration request signal to the control station from the base station, such that the position registration can be completed. Further, the method includes, by the relay terminal station, receiving a position registration acknowledgement signal from the base station; sending the position registration acknowledgement signal to the mobile station from the relay terminal station; and, by the mobile station, receiving the position registration acknowledgement signal from the relay terminal station, such that a position registration can be performed by a mobile station located in the relay terminal zone of the relay terminal station.

With the above-described position registration, the circuit control unit of the control station registers position registration information of a mobile station in a table. The circuit control unit of the control station can realize a base station to which a mobile station located in a relay terminal zone of a relay terminal station belongs, which was conventionally impossible. Consequently, communications become possible between a mobile station located in a relay terminal zone and a base station to which the mobile station belongs.

As describe above, in accordance with the present invention, there is provided a mobile communications system including a control station that identifies a base station zone serving as a communications area of a base station and performs position registration of first mobile stations which belongs to the base station; and a relay terminal station that relays radio communications between the base station and a second mobile station, the second mobile station being located outside the base station zone and inside a relay terminal zone serving as a communications area of the relay terminal station. In the mobile communications system in accordance with the present invention, the second mobile station sends a position registration request signal to the base station via the relay terminal station; the base station receives the position registration request signal and transfers the received position registration request signal to the control station; and, after completing the position registration of the second mobile station based on the position registration request signal, the control station sends a position registration acknowledgement signal to the second mobile station via the base station and the relay terminal station.

The second mobile station may send a position registration request signal to the control station at a certain time period after completion of the position registration of the second mobile station.

When performing the position registration of the second mobile station, the control station may registers a time when the position registration request signal is sent or received together.

The mobile communications system of further may include a table of position registration information provided in a circuit control unit of the control station. Further, when performing the position registration of the second mobile station, the control station may check whether or not the second mobile station is already registered in the table; and newly register the second mobile station along with a number of the base station if the second mobile station is not registered, and update position registration information of the second mobile station with the number of the base station to which the second mobile station currently belongs if the second mobile station is registered.

Further, the mobile communications system may include a display unit provided in the control station on which contents of the table, or whether or not there were are/is the position registration request signal and/or the position registration acknowledgement signal exists is displayed.

In the mobile communications system, the circuit control unit may output notification information that notifies of a presence of the position registration request when circuit control unit receives the position registration request signal, updates contents of the table, and sends the position registration acknowledgement signal.

When the second mobile station is powered, the second mobile station may send a position registration request signal after a random transmission timer arrives at a random timer threshold time.

In the mobile communications system, there may be located a plurality of second mobile stations in the relay terminal zone and random timer threshold times of the second mobile stations may be different from each other.

Further, the difference between any two of the random timer threshold times may longer than a time period needed for any one of the second mobile stations to receive a position registration acknowledgement signal from the control station after sending a position registration request signal.

In the mobile communications system, before the random transmission timer reaches the random timer threshold time, the second mobile station may check whether or not the random transmission timer reaches the random timer threshold time and move to a process of sending the position registration request signal when the random transmission timer arrives at the random timer threshold time.

The mobile communications system further may include a position registration acknowledgement wait timer provided in the second mobile station and, accordingly, after sending the position registration request signal to the base station, the second mobile station may start the position registration acknowledgement wait timer and confirm that the position registration acknowledgement signal is received from the base station.

In the mobile communications system, after sending the position registration request signal, the second mobile station may perform a position registration acknowledgement receiving process in which it is checked whether or not the position registration acknowledgement wait timer arrives at a wait timer threshold time, and determine that the position registration is failed if the position registration acknowledgement wait timer arrives at the threshold.

The wait timer threshold time may be randomly set or vary depending on a type of a mobile station or a priority of an owner of the second mobile station.

In the mobile communications system, the second mobile station may check whether or not the position registration acknowledgement signal is received and, when the position registration acknowledgement signal is received, start a periodic position registration timer and then a position registration completing process.

In the mobile communications system, after the periodic position registration timer reaches a predetermined value, the second mobile station may send a next position registration request signal.

Further, the second mobile station may check whether or not the periodic position registration timer reaches the predetermined value; and, if the periodic position registration timer does not reach the predetermined value, repeat checking of the periodic position registration timer and, if the periodic position registration timer reaches the predetermined value, send the next position registration request signal after a preset time.

The predetermined value of the periodic position registration timer may be shorter than the time interval that the control station regularly resets a position registration information table.

Alternatively, the predetermined value of the periodic position registration timer may be a certain period of time after receiving the position registration acknowledgement signal and the certain period of time may vary depending on a type or a priority of an owner of the second mobile station.

In the mobile communications system, there may be located a plurality of second mobile stations in the relay terminal zone and each of the second mobile stations may have unique random transmission times. Further, once powered, the second mobile stations may send position registration request signals after a lapse of the random transmission times such that the position registration request signals from the respective second mobile stations do not collide each other during a position registration acknowledgement wait time.

In the mobile communications system, the second mobile station may be of direct communication type.

While the invention has been shown and described with respect to the embodiments, it will be understood by those skilled in the art that various changes and modifications may be made without departing from the scope of the invention as defined in the following claims.

What is claimed is:

1. A mobile communications system comprising:
a control station that identifies a base station zone serving as a communications area of a base station and performs position registration of first mobile stations which belongs to the base station; and
a relay terminal station that relays radio communications between the base station and a second mobile station, the second mobile station being located outside the base station zone and inside a relay terminal zone serving as a communications area of the relay terminal station,
wherein the second mobile station sends a position registration request signal to the base station via the relay terminal station; the base station receives the position registration request signal and transfers the received position registration request signal to the control station; and, after completing the position registration of the second mobile station based on the position registration request signal, the control station sends a position registration acknowledgement signal to the second mobile station via the base station and the relay terminal station.

2. The mobile communications system of claim 1, wherein, after completion of the position registration of the second mobile station, the second mobile station sends a position registration request signal to the control station at a certain time period.

3. The mobile communications system of claim 1, wherein, when performing the position registration of the second mobile station, the control station registers a time when the position registration request signal is sent or received together.

4. The mobile communications system of claim 1, further comprising a table of position registration information provided in a circuit control unit of the control station, wherein, when performing the position registration of the second mobile station, the control station checks whether or not the second mobile station is already registered in the table, newly registers the second mobile station along with a number of the base station if the second mobile station is not registered, and updates position registration information of the second mobile station with the number of the base station to which the second mobile station currently belongs, if the second mobile station is registered.

5. The mobile communications system of claim 4, wherein the circuit control unit outputs notification information that notifies of a presence of the position registration request when the circuit control unit receives the position registration request signal, updates contents of the table, and sends the position registration acknowledgement signal.

6. The mobile communications system of claim 1, further comprising a display unit provided in the control station on which contents of the table, or whether or not there are/is the position registration request signal and/or the position registration acknowledgement signal is displayed.

7. The mobile communications system of claim 1, wherein, when the second mobile station is powered, the second mobile station sends a position registration request signal after a random transmission timer arrives at a random timer threshold time.

8. The mobile communications system of claim 7, wherein a plurality of second mobile stations are located in the relay terminal zone and random timer threshold times of the second mobile stations are different from each other.

9. The mobile communications system of claim 8, wherein the difference between any two of the random timer threshold times is longer than a time period needed for any one of the second mobile stations to receive a position registration acknowledgement signal from the control station after sending a position registration request signal.

10. The mobile communications system of claim 7, wherein, before the random transmission timer reaches the random timer threshold time, the second mobile station checks whether or not the random transmission timer reaches the random timer threshold time, and, when the random transmission timer arrives at the random timer threshold time, moves to a process of sending the position registration request signal.

11. The mobile communications system of claim 1, further comprising a position registration acknowledgement wait timer provided in the second mobile station, wherein, after sending the position registration request signal to the base station, the second mobile station starts the position registration acknowledgement wait timer and confirms that the position registration acknowledgement signal is received from the base station.

12. The mobile communications system of claim 11, wherein, after sending the position registration request signal, the second mobile station performs a position registration acknowledgement receiving process in which it is checked whether or not the position registration acknowledgement wait timer arrives at a wait timer threshold time, and determines that the position registration is failed if the position registration acknowledgement wait timer arrives at the threshold.

13. The mobile communications system of claim 12, wherein, the wait timer threshold time is randomly set or varies depending on a type of a mobile station or a priority of an owner of the second mobile station.

14. The mobile communications system of claim 1, wherein the second mobile station checks whether or not the position registration acknowledgement signal is received, and, when the position registration acknowledgement signal is received, starts a periodic position registration timer and then a position registration completing process.

15. The mobile communications system of claim 14, wherein, after the periodic position registration timer reaches a predetermined value, the second mobile station sends a next position registration request signal.

16. The mobile communications system of claim 15, wherein the second mobile station checks whether or not the periodic position registration timer reaches the predetermined value; and, if the periodic position registration timer does not reach the predetermined value, repeats checking of the periodic position registration timer and, if the periodic position registration timer reaches the predetermined value, sends the next position registration request signal after a preset time.

17. The mobile communications system of claim 15, wherein the predetermined value of the periodic position registration timer is shorter than the time interval that the control station regularly resets a position registration information table.

18. The mobile communications system of claim 15, wherein the predetermined value of the periodic position registration timer is a certain period of time after receiving the position registration acknowledgement signal and the certain period of time varies depending on a type or a priority of an owner of the second mobile station.

19. The mobile communications system of claim 1, wherein a plurality of second mobile stations are located in the relay terminal zone and each of the second mobile stations has unique random transmission times; and, once powered, the second mobile stations send position registration request signals after a lapse of the random transmission times such that the position registration request signals from the respective second mobile stations do not collide each other during a position registration acknowledgement wait time.

20. The mobile communications system of claim 1, wherein the second mobile station is of direct communication type.

* * * * *